Nov. 8, 1960 J. R. ZOERNER ET AL 2,959,691

DIFFERENTIATING CIRCUIT UTILIZING CAPACITIVE MEANS AND ALTERNATING SWITCHING DEVICES

Filed Oct. 17, 1957 3 Sheets-Sheet 1

INVENTORS,
JAMES E. STEWART,
JAMES R. ZOERNER,
BY Perry E. Turner
AGENT.

Nov. 8, 1960 J. R. ZOERNER ET AL 2,959,691

DIFFERENTIATING CIRCUIT UTILIZING CAPACITIVE MEANS AND ALTERNATING SWITCHING DEVICES

Filed Oct. 17, 1957 3 Sheets-Sheet 2

INVENTORS.
JAMES E. STEWART,
JAMES R. ZOERNER
BY Perry E. Turner
AGENT.

DIFFERENTIATING CIRCUIT UTILIZING CAPACITIVE MEANS AND ALTERNATING SWITCHING DEVICES

Filed Oct. 17, 1957

INVENTORS.
JAMES E. STEWART,
JAMES R. ZOERNER,
BY Perry E. Turner
AGENT 2,959,691
Patented Nov. 8, 1960

2,959,691

DIFFERENTIATING CIRCUIT UTILIZING CAPACITIVE MEANS AND ALTERNATING SWITCHING DEVICES

James R. Zoerner, Cincinnati, Ohio, and James E. Stewart, Reseda, Calif., assignors to Lear, Incorporated Filed Oct. 17, 1957, Ser. No. 690,769
9 Claims. (Cl. 307—88.5)

This invention relates to electronic circuits for developing output signals proportional to the first time derivative of an input signal, and more particularly to an improved differentiator circuit arrangement wherein the derived signal is obtained with minimum delay.

Differentiator networks are used in many servo amplifier applications, wherein a command signal comprising a modulated carrier wave is differentiated and applied to an amplifier which provides an output signal for use in moving a device to a desired position. However, a distinct disadvantage of such networks results from their component circuits, e.g., discriminator and filter circuits, which considerably delay the response of the amplifier.

It is an object of this invention to provide an improved differentiator network which provides an output signal proportional to the first time derivative of an input signal substantially instantaneously.

It is another object of this invention to provide an improved differentiating circuit in which an alternating switching scheme is employed for instantaneously developing a cyclical output voltage proportional to the first time derivative of an input signal.

Another object of this invention is to provide improved differentiator circuit means in which the output signal is derived from the combination of charges on different capacitive elements.

Figures 3, 4:
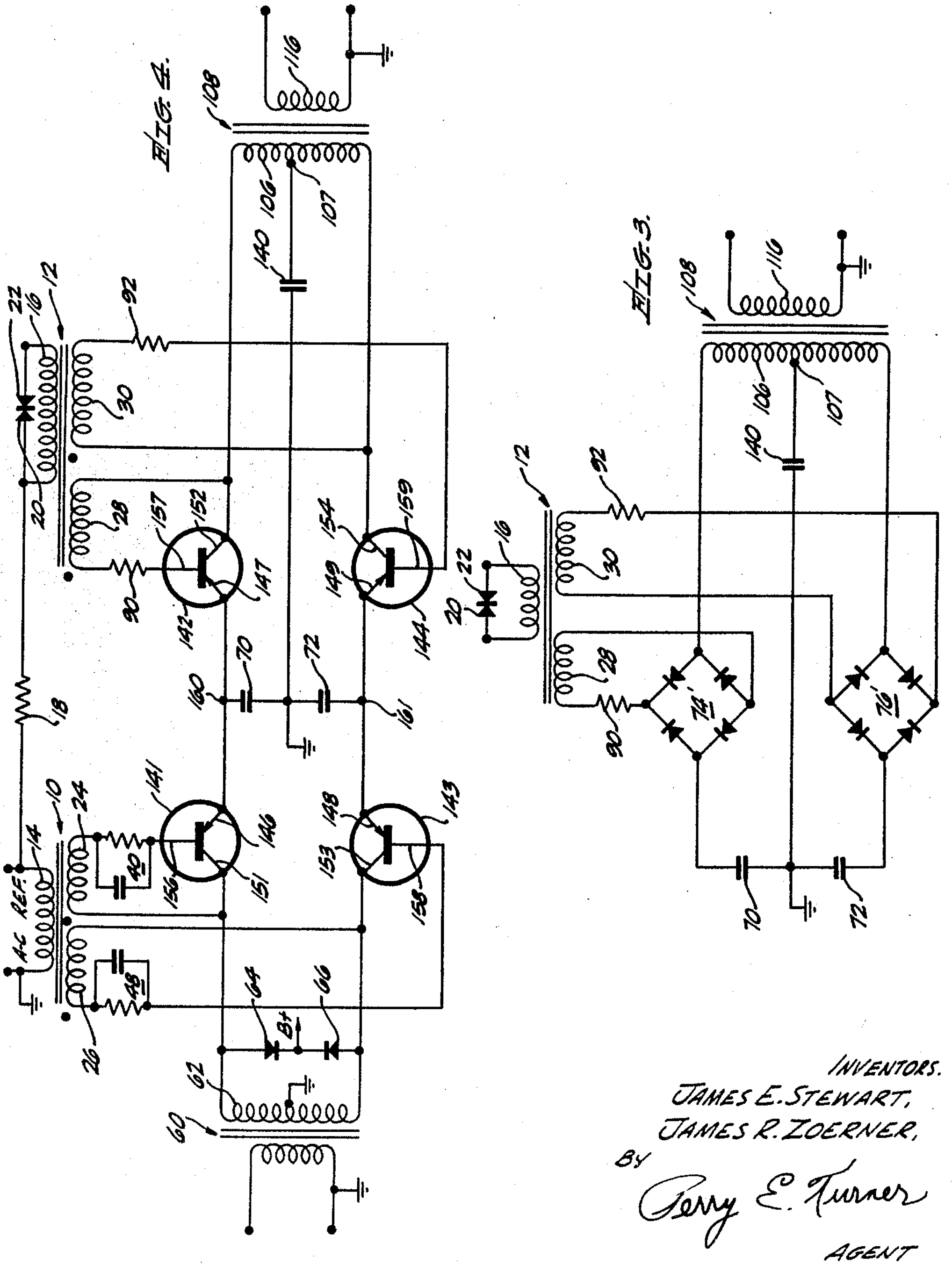

The above and other objects and advantages of this invention will become apparent from the following description, taken in conjunction with the accompanying drawings, in which preferred embodiments are illustrated by way of example. The scope of the invention will be pointed out in the appended claims. In the drawings, Fig. 1 is a schematic diagram of an improved differentiator circuit utilizing diode bridge switching devices, in accordance with this invention, Figs. 2*a*–2*d* illustrate waveforms to aid in explaining the operation of the circuit of Fig. 1, Fig. 3 is a schematic diagram showing a modification of a portion of the circuit of Fig. 1, and Fig. 4 is a schematic diagram, similar to Fig. 1, of an improved differentiator circuit utilizing transistor switching devices, also in accordance with this invention.

Figure 1:
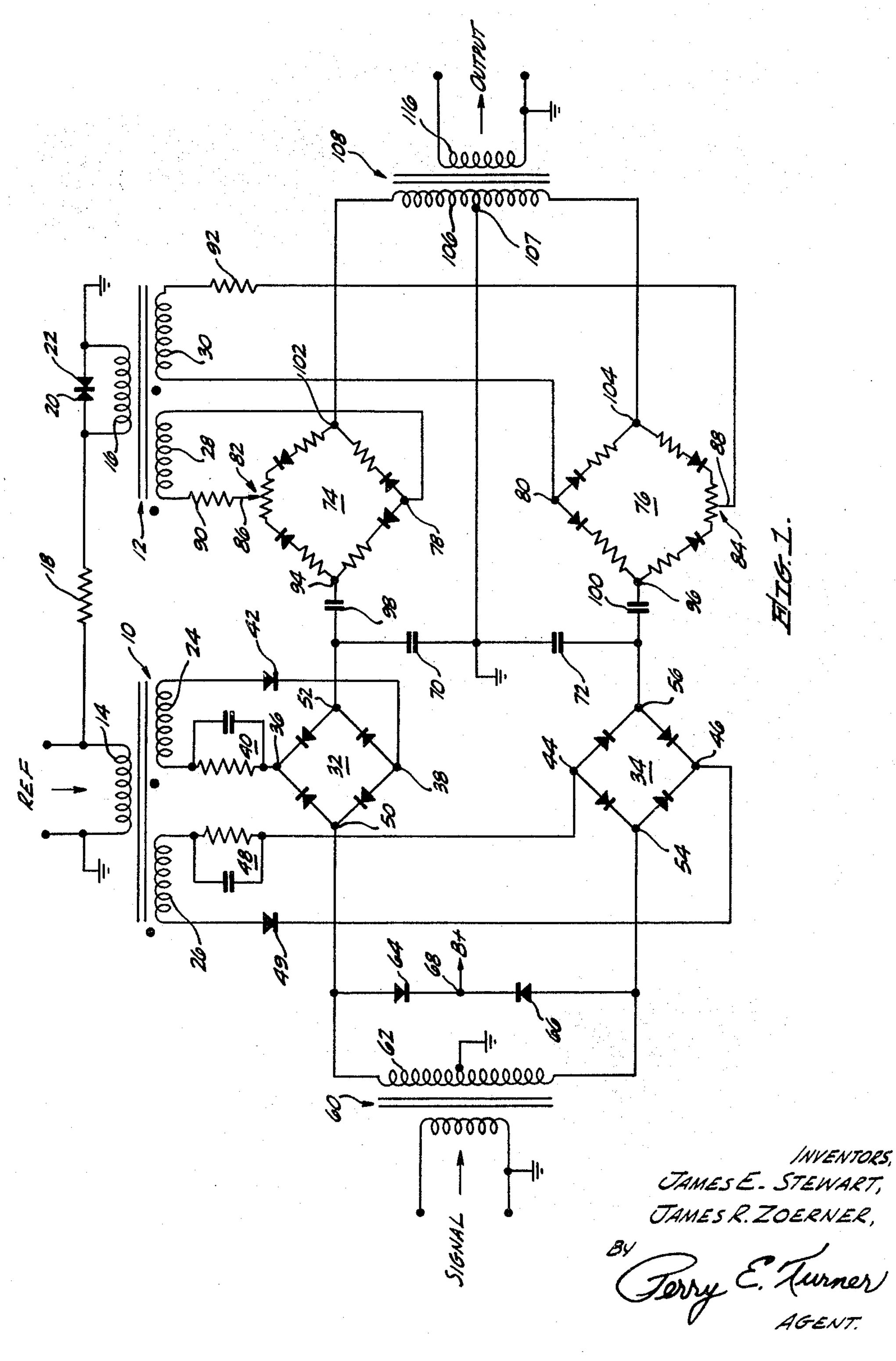

Referring to Fig. 1, a pair of transformers 10, 12 have their respective primary windings 14, 16 connected to a source of sinusoidal reference voltage of predetermined frequency. As illustrated, this is accomplished by connecting respective terminals of primary windings 14, 16 through a resistor 18, and connecting the remaining terminals to reference or ground potential. A pair of diodes 20, 22 are connected back-to-back across the primary winding 16. Thus arranged, a sinusoidal voltage appears across secondary windings 24, 26 of transformer 10 and a square wave voltage appears across the secondary windings 28, 30 of transformer 12.

Secondary windings 24 and 26 are connected across respective switching devices, illustrated as diode bridges 32, 34, and are poled so as to render the switches alternately conducting. As shown, the ends of secondary winding 24 are coupled to the bridge terminals 36, 38 with respect to which two of the diodes are in back-to-back relation; an RC circuit 40 and a unilaterally conductive device or diode 42 are connected in series with secondary winding 24 between such terminals 36, 38. In a similar manner, and connected in series with secondary winding 26 between the bridge terminals 44, 46 relative to which the diodes are in back-to-back relation, are an RC circuit 48 and a unilaterally conductive device or diode 49. Thus arranged, and with secondary windings 24, 26 poled as indicated, the diodes of switch 32 conduct during one-half cycle of the reference voltage, and the diodes of switch 34 conduct during the succeeding half cycle. In this manner, the remaining terminals 50, 52 and 54, 56 of the respective switches are at the same potential when such switches are conducting. However, RC networks 40, 48 function to limit conduction to only a predetermined portion of a half cycle of the reference voltage, i.e., the values of the components of these networks are chosen to permit portions of the charges on the capacitor thereof to leak off when the associated switch is not conducting. Thus, on the succeeding half cycle, the capacitor charges and the associated switch conducts only for a portion of that half cycle.

A transformer 60 for receiving cyclical signal voltages of the frequency of the reference voltage, and which constitutes a low impedance input circuit, has the ends of its secondary winding 62 connected to terminals 50, 54 of switches 32, 34. Secondary winding 62 has a center-tap connection to ground. Also, connected across the ends of secondary winding 62 are unilaterally conductive devices, shown as diode 64, 66, connected in back-to-back relation, with the junction 68 thereof connected to the positive terminal, B+, of a D.-C. supply source. Diode 64, 66 will be recognized as providing a limiter, whereby the amplitudes of the signal voltages appearing across secondary winding 62 are prevented from exceeding a predetermined maximum amplitude.

With the arrangement above-described, it will be apparent that since terminals 50—52, 54—56 will be at the same potential during conduction of the associated switch, any signal voltage present at terminals 50, 54 will appear alternately at terminals 52, 56. Capacitors 70, 72 connected between terminals 52 and 56 to ground will be charged upon conduction of switches 32, 34, in a manner to be explained.

Secondary windings 28 and 30 are also connected to respective switches, shown as diode bridges 74, 76 to be rendered alternately conducting. Switches 74, 76 are similar to switches 32 and 34, except that a resistor is located in each leg with a respective diode. Switches 74, 76 have respective terminals 78, 80, corresponding to terminals 38, 44 of switches 32, 34, to which diodes are connected in back-to-back relation. Such terminals are connected to one end of secondary windings 28, 30 as shown. The remaining diodes of switches 74, 76, instead of being connected through a common junction such as junctions 36, 46 of switches 32, 34, are connected through respective potentiometers 82, 84, the sliding contacts 86, 88 of which are connected through respective resistors 90, 92 to the remaining ends of secondary windings 28, 30. Input terminals 94, 96 of switches 74, 76 correspond to input terminals 50, 54 of switches 32, 34, and are connected through respective capacitors 98, 100 to the output terminals 52, 56 of switches 32, 34. The output terminals 102, 104 of bridges 74, 76 are connected to the ends of the primary winding 106 of an output transformer 108, which constitutes a high impedance output circuit, such primary winding 106 having a center-tap connection 107 to ground.

Figures 2A, 2B, 2C, 2D:
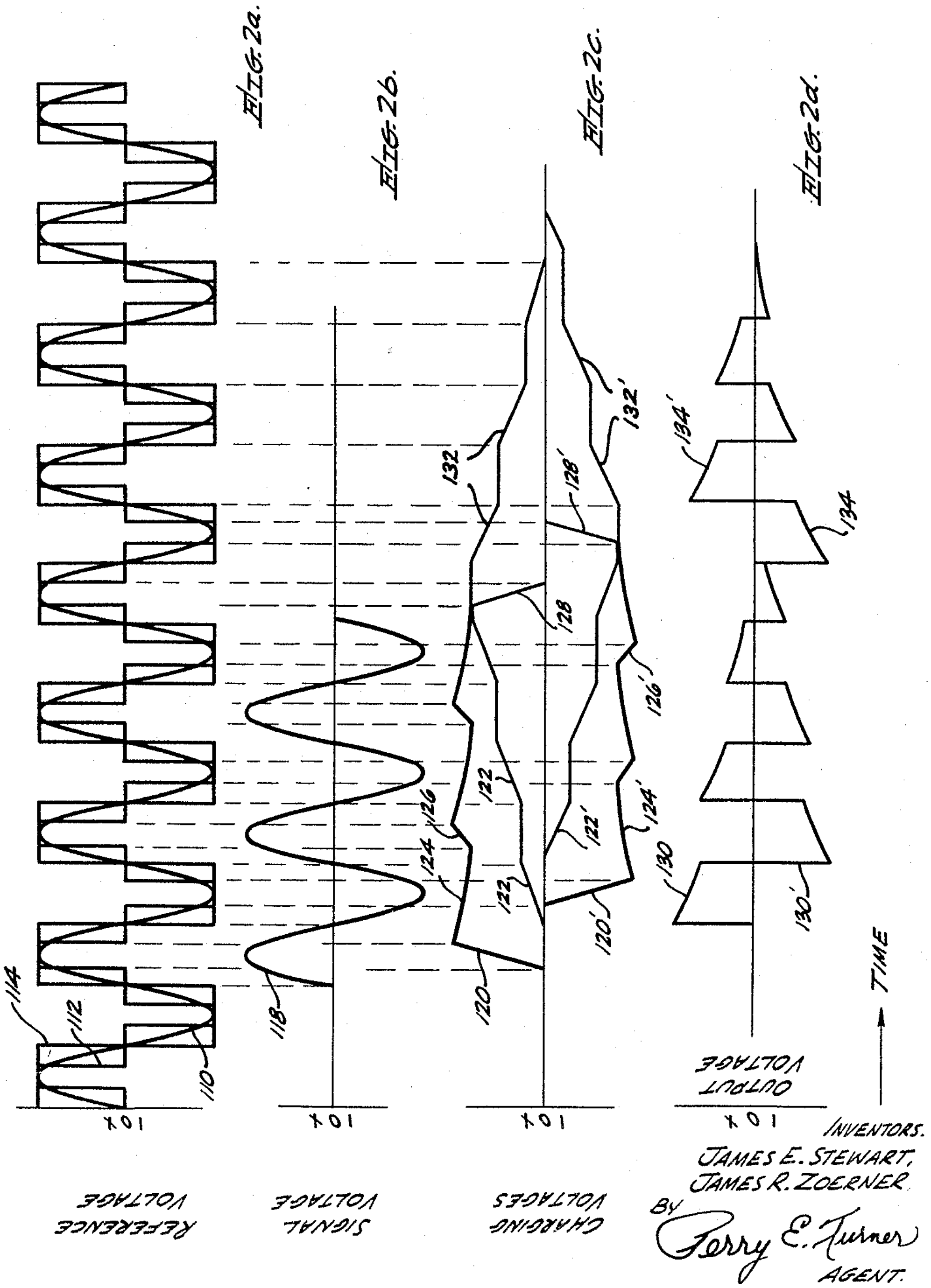

The operation of the above-described circuit will be explained in connection with Figs. 2a–2b along with Fig. 1. As previously indicated, and as shown in Fig. 2a, the reference voltage appearing across secondary windings of transformer 10 is a sinusoidal voltage 110, whereas such reference voltage appears across the secondary windings of transformer 12 as a square wave form 112. Also as indicated, RC networks 40, 48 establish conduction through bridges 32, 34 for predetermined periods of the sinusoidal waveform. In Fig. 2a, this conduction period is indicated as a cyclical waveform 114 which, for the purpose of convenience, is shown to begin and terminate at a predetermined time ahead of and following the peaks of the sinusoidal waveform 110. If desired, transformer 10 may be arranged as a peaked transformer, in which case waveform 114 would represent the peaked waveform appearing across the secondary winding 24, 26.

Not only are switches 32—34 and 74—76 alternately conducting, but the various secondary windings 24, 26, 28, 30 are so poled that switches 32—74, and 34—76 are also alternately conducting. During conduction of switch 32, in the presence of a signal across secondary winding 62 of the input transformer 60, output terminal 52 will be at the same potential as its input terminal 50, thereby to allow capacitors 70 and 98 to receive a charge. Since switch 74 is nonconducting at this time, the charges will not leak off. On the succeeding half cycle when bridge 32 is not conducting and bridge 74 is conducting, whereby terminals 94 and 102 of such bridge are at the same potential, a voltage will appear across the upper half of primary winding 106 of the output transformer 108 which corresponds to the difference between the charge on capacitor 70 and the charge on capacitor 98. Since switches 34, 76 operate in the same manner as switches 32, 74, a similar voltage will be applied to the lower half of primary winding 106, representing the difference between the charges on capacitors 72, 100. The result is a cyclical output voltage across the secondary winding 116 of output transformer 108 which is proportional to the first time derivative of the input signal.

The above operation may be more clearly understood from the waveforms of Figs. 2a–2d. Fig. 2b illustrates a signal voltage 118 occurring for a brief period along the time scale. Assuming signal voltage 118 is in phase with the reference or switching voltages 110, 112, capacitor 70 will charge up during conduction of switch 32, as indicated at 120 in Fig. 2c. On the succeeding half cycle, capacitor 98 receives a charge as indicated at 122. Part of the charge on capacitor 70 will leak off, as indicated at 124, until the succeeding conducting period of switch 32, when it will charge again as indicated at 126.

Meanwhile, while the signal exists, capacitor 98 will receive additional incremental charges 122 during nonconduction of switch 32, and which remain at the succeeding levels during conduction of such switch. This build-up continues until the charge on capacitor 98 is equal in magnitude to the charge on capacitor 70.

The above-described operation means that when switch 32 is non-conducting and switch 74 is conducting, a voltage corresponding to the difference between the charges on capacitors 70 and 98 is delivered to the output transformer 108, appearing across the secondary winding 116 thereof as voltage pulses 130 which decrease in magnitude as the magnitudes of the charges approach equality.

Similar charging on capacitors 72, 100 results in voltage pulses 130′ of opposite sense, whereby pulses 130, 130′ form a cyclical output signal voltage which is proportional to the first time derivative of signal voltage 118.

After capacitors 70, 72 are discharged, as indicated at 128, 128′, the charges on capacitors 98, 100 remain. Thereafter, these charges decrease, as indicated at 132, 132′ (Fig. 2c) and result in output voltages 134, 134′ which are opposite in phase to output voltages 130, 130′, and which decrease to zero as the charges reduce to zero.

It should be noted that an output voltage of opposite phase to that represented as 130, 130′ will be developed when the signal voltage is of opposite phase to that shown in Fig. 2b. In such case, an output voltage of opposite phase to that shown at 134, 134′ will result when the signal becomes zero.

Fig. 3 illustrates an arrangement wherein a single-capacitor 140 connected between the center-tap 107 of primary winding 106 and ground serves the same purpose as capacitors 98, 100 of Fig. 1. Also, the switches 74, 76 are replaced with simplified diode bridges 74′, 76′ wherein the resistors and potentiometers are eliminated. It will be apparent that the potentiometers of Fig. 1 are provided for the purpose of adjustment, and do not form a necessary part of this invention.

Fig. 4 illustrates an arrangement wherein the switching means comprise p-n-p junction transistors 141, 142, 143 and 144, which have respective emitter electrodes 146, 147, 148, 149, collector electrodes 151, 152, 153, 154 and base electrodes 156, 157, 158, 159. The emitter electrodes 146, 147 are connected together, as are emitters 148, 149, and their respective junctions 160, 161 are connected to capacitors 70, 72. Secondary windings 24, 26 and their RC networks 40, 48 are connected between the base and collector electrodes 156—151 and 158—153 of transistors 141, 143. Similarly, secondary windings 28, 30 and their resistors 90, 92 are connected between the base and collector electrodes 157—152 and 159—154 of transistors 142, 144.

The conditions of operation are the same as for the circuit of Fig. 1, in that the magnitude of the reference voltage is greater than the signal voltages, transistors 141, and 142, and also transistors 143, and 144, are rendered alternately conducting; also transistors 141, 143, and 142, 144, conduct alternately. Each transistor will conduct when its base draws sufficient current, and under these circumstances the associated emitter and collector are placed at the same potential. This result apparently obtains because a positive potential at the base electrode relative to the collector effectively short circuits the barrier layer between the emitter and collector electrodes. Operation of the transistors will effect charging and discharging of capacitors 70, 72 and 140 in the manner previously explained.

It should be noted that since the output signal from the circuit of this invention is developed substantially instantaneously, as illustrated in Figs. 2a–2d, there is avoided the problem of delay in prior art discriminator-modulator circuits which utilize an undesirable amount of filtering to improve the signal-to-noise ratio of the circuit. Furthermore, the problem of output noise due to static signals at the input is substantially eliminated. The switching scheme employed in this invention insures that noise at the output is substantially independent of static signal at the input; accordingly, the circuit of this invention is characterized by a signal-to-noise ratio which is substantially independent of static signal at the input.

Although p-n-p junction transistors are illustrated and described, it will be apparent that n-p-n junction transistors may also be employed, in which case the potentials dealt with are reversed.

It should also be noted that diodes 42, 49 of Fig. 1 may be eliminated; the construction of the switches can insure that conduction will occur only during one half of each cycle of the reference voltage. Finally, RC networks may be replaced with current limiting resistors to permit conduction of the switches 32, 34 of Fig. 1, and transistor switches 141, 143 of Fig. 4, throughout a full half cycle. In fact, square waves may also be employed for controlling these switches, in which case only one transformer with one primary winding need be used.

What is claimed is:

1. A differentiator circuit comprising a first pair of switching devices each having input and output terminals, a low impedance input circuit connected to said input terminals, respective capacitors connected between said output terminals and a point of reference potential, a high impedance output circuit, a second pair of switching devices, capacitive means connected in circuit with each of said second pair of switching devices and with said output circuit between the output terminals of the respective switching devices of the first pair and said point of reference potential, a source of reference voltage of predetermined frequency, means coupling said source to each of said switching devices, said switching devices being characterized in that they are rendered alternately conducting in response to said reference voltage, said switching devices also being characterized in that their input and output terminals are at the same potential during conduction, said ones of the switching devices of each pair also being alternately conducting relative to each other, and means to apply a cyclical signal of said predetermined frequency to said input circuit.

2. A differentiator circuit in accordance with claim 1, wherein said input circuit includes a transformer having a center-tap connection to said point of reference potential, the ends of said secondary winding being connected to the respective input terminals of said ones of the switching devices of each pair, and said output circuit including a transformer having a primary winding with ends connected to the output terminals of each of said second pair of switching devices, said primary winding having a center-tap connection to said point of reference potential, and said capacitive means includes respective capacitors connected in series with each of the switching devices of said second pair between the output terminals of the respective switching devices of the first pair and one end of said primary winding.

3. A differentiator circuit in accordance with claim 2, wherein said capacitors are connected between the output terminals and input terminals respectively of the switching devices of said first and second pair.

4. A differentiator circuit in accordance with claim 1, wherein said output circuit includes a transformer having a primary winding with ends connected to output terminals of the respective switching devices of the second pair, and said capacitive means includes a capacitive element connected between the center-tap of said primary winding and said point of reference potential.

5. A differentiator circuit in accordance with claim 1, wherein said means coupling the switching devices to the source of reference voltage effect conduction of each device of the first pair only during a predetermined portion of a respective half cycle, and wherein each switching device of the second pair is rendered conducting throughout a respective half cycle of each cycle of the reference voltage.

6. A differentiator circuit in accordance with claim 5, wherein said source of reference voltage includes means to develop a square wave voltage for controlling conduction of the switching devices of said second pair.

7. In combination, a first pair of switching devices, said switching devices being characterized in that they are rendered alternately conducting in response to a cyclical reference voltage, said switching devices also being characterized in that input and output terminals thereof are at the same potential during conduction, a low impedance input circuit for receiving cyclical input signals connected between the input terminals of said switching device, first and second capacitive means connected between a point of reference potential and the output terminals of the respective switching devices, high impedance output circuit means connected to the output terminals of said switching devices, said output circuit means including third capacitive means and a second pair of switching devices similar to the first pair of switching devices, said third capacitive means connected in circuit with each of said switching devices of the second pair between the output terminals of the switching devices of the first pair and said point of reference potential, a source of reference voltage of the frequency of the input signals, and means responsive to the reference voltage to render the switching devices conductive on alternate half cycles such that the switching devices of the first pair are alternately conductive and the switching devices of both pairs in circuit through said output circuit means are alternately conductive.

8. In combination, first and second capacitors each having one terminal connected to a point of reference potential, a source of cyclical signals of predetermined frequency, means to connect said capacitors to said source on alternate half cycles of the signals, a high impedance output circuit, first and second switching devices, capacitive means connected in circuit with both switching devices and respective portions of said output circuit across the respective capacitors, a source of cyclical reference voltage of said predetermined frequency, and means to render said switching devices alternately conductive in response to said reference voltage, wherein said output circuit includes a transformer, a primary winding for said transformer having a center-tap connection to ground, and said capacitive means includes respective capacitors connected in series with the respective switching devices between a respective terminal of said primary winding and respective capacitor.

9. A differentiator circuit in accordance with claim 8, wherein the means for applying the signal alternately to said capacitors includes third and fourth switching devices each having an input terminal to which said signal is applied and an output terminal connected to a respective one of the capacitors, and said third and fourth switching devices also being coupled to said source of reference voltage and rendered alternately conducting thereby.

References Cited in the file of this patent

UNITED STATES PATENTS

| | | |
|---|---|---|
| 2,250,284 | Wendt | July 22, 1941 |
| 2,335,612 | Reiskind | Nov. 30, 1943 |
| 2,820,143 | D'Nelly | Jan. 14, 1958 |
| 2,833,918 | Knox | May 6, 1958 |